US008666300B2

(12) United States Patent
Haimowitz

(10) Patent No.: US 8,666,300 B2
(45) Date of Patent: Mar. 4, 2014

(54) EDUCATIONAL PROGRAM ASSESSMENT USING CURRICULUM PROGRESSION PATHWAY ANALYSIS

(76) Inventor: Steven M. Haimowitz, Nyack, NY (US)

(*) Notice: Subject to any disclaimer, the term of this patent is extended or adjusted under 35 U.S.C. 154(b) by 384 days.

(21) Appl. No.: 13/098,078

(22) Filed: Apr. 29, 2011

(65) Prior Publication Data

US 2012/0276514 A1 Nov. 1, 2012

(51) Int. Cl.
*G06F 17/00* (2006.01)

(52) U.S. Cl.
USPC ............................................. 434/350

(58) Field of Classification Search
USPC ......................................... 434/350
See application file for complete search history.

(56) References Cited

U.S. PATENT DOCUMENTS

| 5,306,154 | A | 4/1994 | Ujita et al. |
| 5,820,386 | A * | 10/1998 | Sheppard, II ................ 434/322 |
| 6,016,486 | A | 1/2000 | Nichols |
| 6,652,283 | B1 | 11/2003 | Van Schaack et al. |
| 7,362,997 | B2 | 4/2008 | Hartenberger |
| 7,367,808 | B1 * | 5/2008 | Frank et al. ................... 434/219 |
| 2002/0127525 | A1 * | 9/2002 | Arington et al. ............. 434/262 |
| 2002/0138841 | A1 * | 9/2002 | Ward .............................. 725/78 |
| 2002/0142278 | A1 * | 10/2002 | Whitehurst et al. .......... 434/350 |
| 2002/0180770 | A1 * | 12/2002 | Sirhall ......................... 345/700 |
| 2002/0182570 | A1 * | 12/2002 | Croteau et al. ................ 434/107 |
| 2003/0073064 | A1 * | 4/2003 | Riggs ........................... 434/350 |
| 2003/0187723 | A1 * | 10/2003 | Hadden et al. ................. 705/11 |
| 2003/0207739 | A1 * | 11/2003 | Whitall et al. ................. 482/92 |
| 2004/0014016 | A1 * | 1/2004 | Popeck et al. ................ 434/322 |
| 2004/0014017 | A1 | 1/2004 | Lo |
| 2005/0131747 | A1 * | 6/2005 | Vigil ................................ 705/7 |
| 2005/0170325 | A1 | 8/2005 | Steinberg et al. |
| 2005/0227215 | A1 | 10/2005 | Bruno et al. |
| 2007/0134631 | A1 * | 6/2007 | Hardy et al. .................. 434/236 |
| 2007/0166675 | A1 * | 7/2007 | Atkins et al. ................. 434/236 |
| 2008/0124696 | A1 | 5/2008 | Houser et al. |
| 2008/0177504 | A1 * | 7/2008 | Niblock ........................ 702/182 |
| 2008/0280280 | A1 * | 11/2008 | Romer .......................... 434/356 |
| 2009/0142742 | A1 * | 6/2009 | Goldberg ..................... 434/362 |
| 2009/0187124 | A1 * | 7/2009 | Ludlow et al. .................. 601/47 |
| 2009/0198493 | A1 * | 8/2009 | Hakkani-Tur et al. ........ 704/235 |
| 2009/0325140 | A1 * | 12/2009 | Gray et al. .................... 434/353 |
| 2009/0327053 | A1 * | 12/2009 | Niblock ......................... 705/11 |

(Continued)

OTHER PUBLICATIONS

Moore, Donald E., et al., "Achieving Desired Results and improved Outcomes: Integrating Planning and Assessment Throughout Learning Activities," Journal of Continuing Education in the Health Professions, vol. 29, n. 1, pp. 1-15 (2009).

*Primary Examiner* — Nathan Hillery
(74) *Attorney, Agent, or Firm* — Jack V. Musgrove

(57) ABSTRACT

A curriculum progression pathway analysis assesses an educational program having multiple activities defining multiple learner tracks by organizing the learners into groups based on the learner tracks and, for each learner group, calculating a baseline average score, a post-activity average score, and statistical differences between the baseline average score and the post-activity average scores. Any significant statistical differences are identified, and a report may be generated describing statistical conclusions and inferences. The invention can further provide a domain-based learner analysis for curriculum, a domain-based learner analysis for activities, and a learner retention analysis. In an application for continuing medical education the performance index test includes a clinical vignette, a set of statements which are moved to either a best practices column or a not best practices column, and an indicator for an allowable number of moves to achieve a perfect score.

15 Claims, 7 Drawing Sheets

(56) References Cited

U.S. PATENT DOCUMENTS

| | | |
|---|---|---|
| 2010/0156653 A1* | 6/2010 | Chaudhari et al. .......... 340/686.1 |
| 2010/0250318 A1* | 9/2010 | Paramoure et al. ............... 705/8 |
| 2011/0033829 A1* | 2/2011 | Popeck et al. ................ 434/219 |
| 2011/0060692 A1* | 3/2011 | Martin ......................... 705/301 |
| 2011/0070572 A1* | 3/2011 | Miller et al. .................. 434/322 |
| 2012/0077160 A1* | 3/2012 | Degutis et al. ................ 434/236 |
| 2012/0288846 A1* | 11/2012 | Hull ............................. 434/365 |

\* cited by examiner

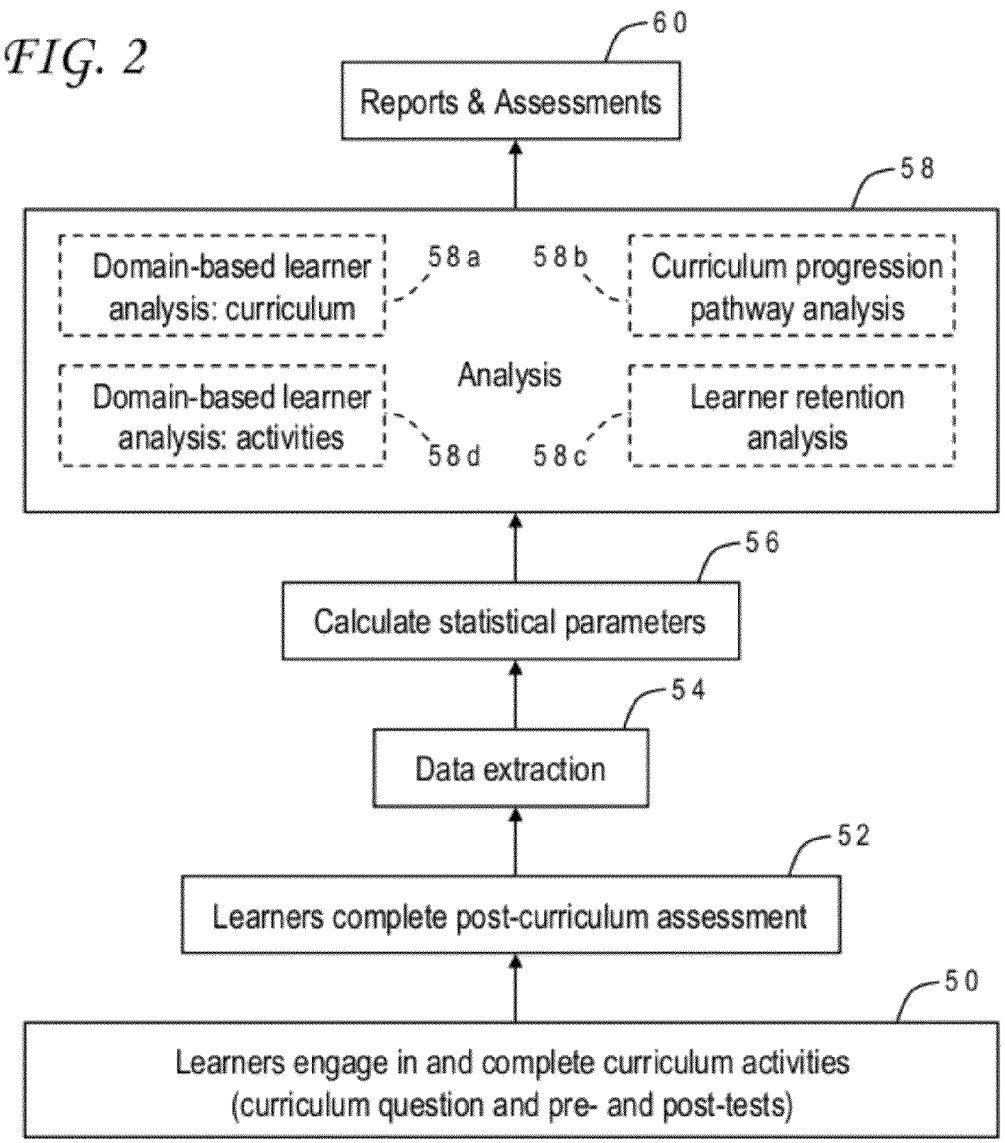
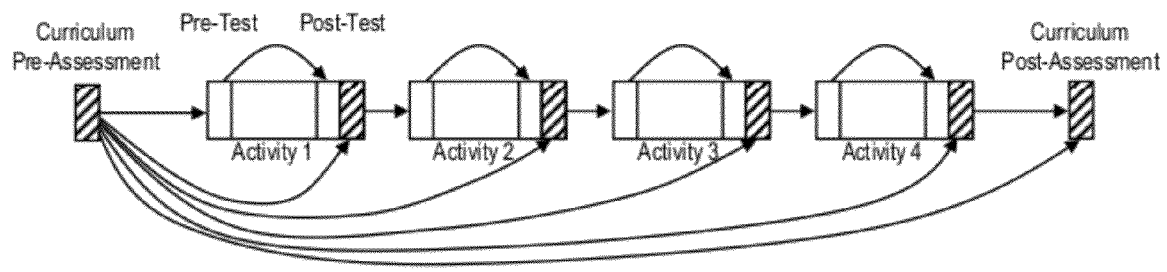

EDUCATIONAL PROGRAM ASSESSMENT USING CURRICULUM PROGRESSION PATHWAY ANALYSIS

BACKGROUND OF THE INVENTION

1. Field of the Invention

The present invention generally relates to educational programs, and more particularly to a method of assessing an educational program having multiple learner tracks.

2. Description of the Related Art

The number and types of available educational programs have increased dramatically in the last decade due to a variety of circumstances including expanded educational opportunities and the spread of information technologies such as the Internet. It is important to educators, including program designers and administrators, to be able to accurately gauge the impact of a particular educational program, whether in a traditional classroom context or a more progressive setting such as online instruction. If a particular educational program appears to be ineffective, it should be replaced, or those aspects of the program which are less effective should be redesigned.

Nowhere is it more important to be able to assess program results than in the field of medical education. A real-world mistake made by a learner in such a program can result in disability or death. This importance applies to original instruction as well as continuing medical education. Continuing medical education (CME) provides medical professionals with the opportunity to acquire different types of knowledge that leads to the development of new understandings, skills, and capabilities with the ultimate goal of providing patients with the best care possible. One system for evaluating the effectiveness of CME activities was formulated by D. E. Moore and is referred to as Moore's outcomes framework. According to this framework there are seven levels for assessment: level 1—participation (the number of medical professionals participating in an activity); level 2—satisfaction (the degree to which the expectations of participants were met regarding the presented material and delivery of the activity); level 3—knowledge (the degree to which participants state or indicate what the activity intended them to be able to accomplish); level 4—competence (learners' capability or the degree to which participants show how to accomplish what the activity intended); level 5—performance (the degree to which the participants actually accomplish what the activity intended); level 6—patient health (changes in the health of the participants' patients); and level 7—community health (changes in the health of a patient population associated with changes in participants' practices). Most practical assessments of CME curriculum will focus on the first five of these levels since the last two require extensive survey data.

Even with Moore's framework, it can be difficult to quantitatively assess the value of a continuing medical education program, particularly in the area of participant performance. Furthermore, in programs having multiple activities which define different learner tracks, there is no known methodology for assessing the individual pathways of learners through the curriculum. It would, therefore, be desirable to devise an improved method of assessing an educational program which could identify any significant progress in the curriculum pathways. It would be further advantageous if the method could be compatible with assessments using Moore's outcomes framework for CME programs.

SUMMARY OF THE INVENTION

It is therefore one object of the present invention to provide an improved method of assessing an educational program.

It is another object of the present invention to provide such a method which can assess the impact of multiple activities from baseline to curriculum completion or post-curriculum.

It is yet another object of the present invention to provide such a method which can be applied to continuing medical education in a manner that is compatible with Moore's outcomes framework.

The foregoing objects are achieved in a curriculum progression pathway analysis for assessing an educational program having multiple activities defining multiple learner tracks, by receiving baseline performance scores and post-activity performances scores derived from a performance index test administered to the learners prior to any of the activities and after each of the activities, organizing the learners into groups based on how many of the learner tracks they have completed, and for each learner group calculating a baseline average score, a post-activity average score for each activity completed by learners, and statistical differences between the baseline average score and the post-activity average scores, as well as between each post-activity average score and any successive post-activity average scores. Any statistical differences which are equal to or less than a predetermined probability threshold are identified. A report may be generated describing statistical conclusions and inferences associated with the identified differences. The method can calculate the statistical differences using paired sample t tests for the performance index test, in which case one acceptable probability threshold is a P value of 0.05.

The invention can further provide: (i) a domain-based learner analysis for a curriculum which identifies statistical differences between pre-test average scores and corresponding post-test average scores for each of a plurality of domains including at least knowledge, competence, confidence and performance; (ii) a domain-based learner analysis for activities which identifies statistical differences between pre-test average scores and corresponding post-test average scores by each activity; and (iii) a learner retention analysis which identifies statistical differences between the baseline average score and a post-curriculum assessment average score as well as between the post-activity average scores and the post-curriculum assessment average score. In an exemplary embodiment the performance index test includes a description of circumstances for a sample situation, a set of questions in the form of statements which are to be assigned to only one of at least two statement categories, and an indicator for an allowable number of assignments and re-assignments of the statements to particular categories in order to achieve a perfect score. In an application for continuing medical education, the description can be a clinical vignette.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIG. 2 is a chart illustrating learner participation in an educational program followed by analysis, reporting and assessment according to one implementation of the present invention;

FIG. 3 is a pictorial representation of an educational curriculum including multiple activities with pre- and post-tests, and curriculum pre- and post-assessments, according to one implementation of the present invention;

The use of the same reference symbols in different drawings indicates similar or identical items.

DESCRIPTION OF THE PREFERRED EMBODIMENT(S)

Figure 1:
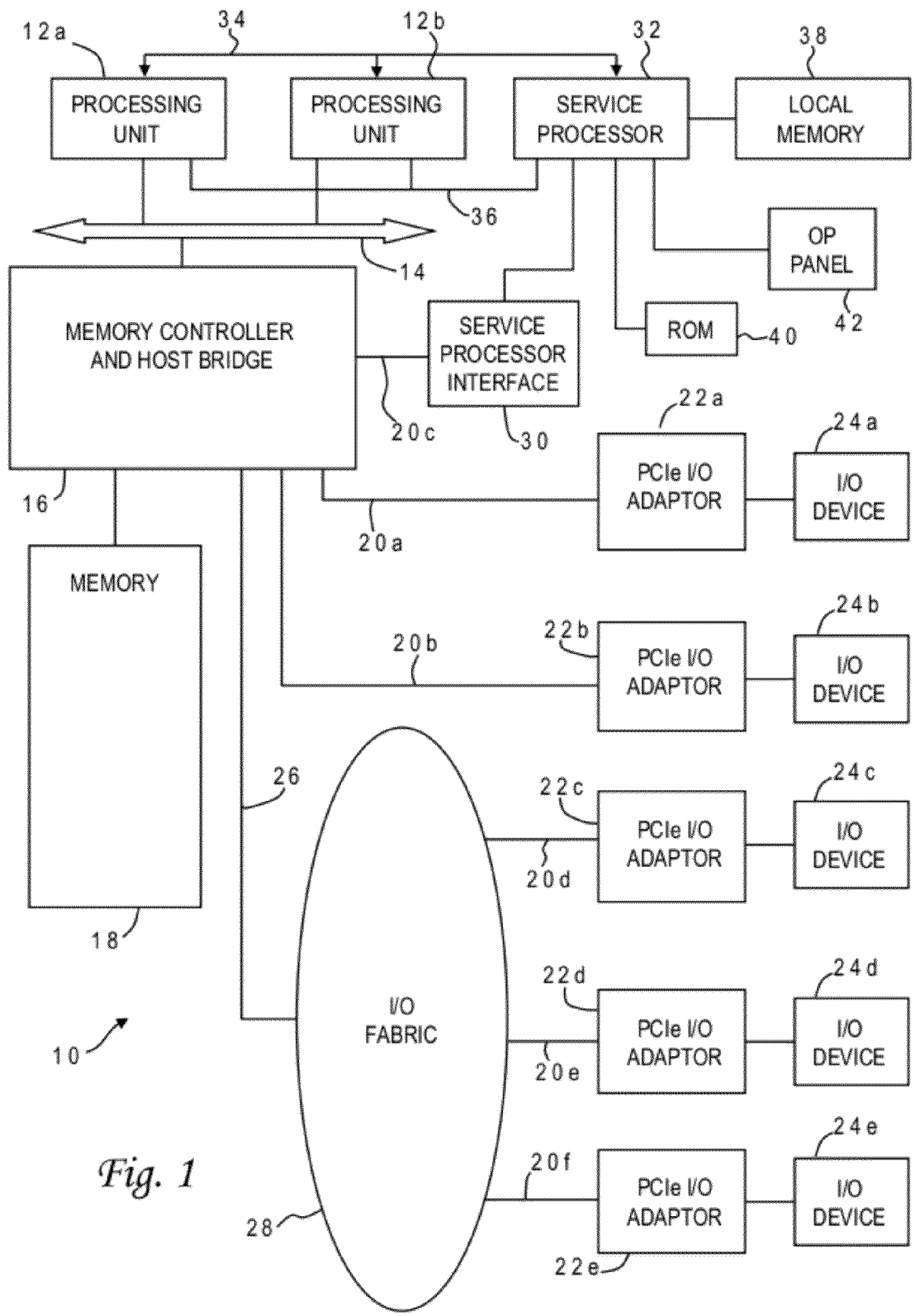
FIG. 1 is a block diagram of a computer system programmed to carry out educational program assessment in accordance with one embodiment of the present invention.

With reference now to the figures, and in particular with reference to FIG. 1, there is depicted one embodiment 10 of a computer system in which the present invention may be implemented to carry out assessments of educational programs. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the educational assessment application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer may be a desktop, laptop, notebook, tablet, hand-held device (such as a smartphone or personal digital assistant), or other physical embodiments.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media exclude transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for an education assessment process that uses novel analyses to measure educational progress on many levels. Accordingly, a program embodying the invention may include conventional aspects of various statistical tools, and these details will become apparent to those skilled in the art upon reference to this disclosure. Computer system 10 may additionally be provided with related software applications such as the educational program itself or portions thereof, as well as utilities for receiving or transmitting relevant information to or from remote sites over a network such as the Internet.

In an illustrative implementation, the invention provides a system for assessing continuing medical education (CME) participant performance consistent with Moore's level 1-5 outcomes framework. The curriculum content can reflect best-practices in the clinical area of relevance to be covered in the educational activity (e.g., diabetes, asthma, dementia, etc.). Question sets (pre-test and post-test) can be broken down into domains that reflect learning assessment qualities represented by Moore's levels, with associated reports for each level. Table 1 illustrates the reports which can be included in an exemplary embodiment.

TABLE 1

| Moore's Outcomes Framework Level | Reports |
| --- | --- |
| 1 (Participation) | Participant Number and Engagement report |
| 2 (Satisfaction) | Selection of participant responses completed by learners after the completion of the activity |
| 3 (Knowledge) | Change in Knowledge report<br>Learning Objectives report<br>Subject mastery report |
| 4 (Competence) | Change in Competence report<br>Change in Confidence report |
| 5 (Performance) | Performance Index reports<br>Change in practice report |

Referring now to FIG. 2, there is depicted a chart illustrating an example of an overall process including learner participation in an educational program as well as the analysis, reporting and assessment of the educational program which is accomplished according to embodiments of the present invention. Learners first engage in and complete the curriculum activities 50. As seen in FIG. 3, each of these activities has associated questions given as a pre-test and a post-test, which are separate from a performance index question described further below in conjunction with FIG. 4 which may also be administered after the completion of each activity. While the activities have a prescribed order they may be completed by a learner out of order. The curriculum may include other activities in various formats which are not utilized by the present invention. A potential learner (e.g., medical health professional) may engage in an educational activity through several channels including: email from an online CME distributor; independent internet search for new CME content; smartphone application; referral from colleagues; or exposure to content through live meetings. A learner may engage in activities in a single curriculum through a mix of such channels. If the participant has engaged previously in CME activities in any form an appropriate alert can be sent to that participant when additional activities are available in the curriculum, the learner has scheduled (or missed) a specific date to participate in an activity, an activity was started but not completed, an accreditation deadline is near (e.g., 2 weeks) and the activity remains unfinished, a learner has set a personal goal related to his or her performance, or an activity launches that is pertinent to the specialty that the learner set in his or her profile. Each activity may for example take approximately 30-60 minutes to complete. Upon completion the learner may be awarded appropriate continuing education credits, reflective of time spent on the activity, a post-activity test score, or an evaluation made by the accreditor.

Returning to FIG. 2, the learners also complete a post-curriculum assessment (PCA) 52 which includes each separate activity test and the performance index test. Following the completion of the curriculum (or a selection of activities from the curriculum), the PCA can be generated in an authoring tool and set to be sent to curriculum participants within a designated period of time (e.g., 6-8 weeks) after the completion of their final activity (the same authoring tool can be used to create the activities and questions). Learners can receive an alert to complete the PCA via email.

The assessment methods of the present invention can begin after the learners have completed all or a selection of the curriculum activities and the PCA, analyzing the relevant data to evaluate the effectiveness of the educational program. A system embodying the invention such as computer system 10 can start the assessment process by receiving the various performance scores, for example extracting the data from a database 54. The database may be built during the educational program or after the program is complete. Data extraction may include responses to pre-test and post-test questions having various formats (e.g., multiple choice, true/false, Likert) representing the educational area being tested, and can be identically matched between a given activity's pre-test and post-test questions encompassing knowledge, competence, confidence and practice patterns. Learners' responses to individual items can be summed by activity and by domain (knowledge, competence), and given a total score such as a percentage correct out of 100%, at pre-test and post-test. The data may also include responses to the performance index question; learners' responses to individual items can be totaled and expressed as a percentage correct out of 100%, at baseline and following every activity in the curriculum. The data may further include responses to evaluation questions (un-scored); learners' responses to individual items can be summed (confidence and practice questions) and given a mean value at pre-test and post-test.

Various statistical parameters can then be calculated 56 based on these scores. This portion of the analysis may be carried out utilizing the SPSS Statistics version 19.0 software package sold by International Business Machines Corp. of Armonk, N.Y. Curriculum data can be arranged hierarchically according to Participant, Question, Domain, Activity, and PCA. Each pre-test question can be matched with the same question at post-test for that activity. For each question/domain, data are preferably first arrayed using frequencies to determine data distribution and assist in more complex analyses. Central tendency may be characterized based on mean, median, mode, and sum. Dispersion may be characterized by standard deviation, variance, range, minimum score, maximum score, and standard error of the mean. While computer system 10 may carry out the foregoing calculations, they may instead be calculated earlier by a different system, and computer system 10 may receive these statistical values for further assessment without receiving all of the raw score data.

The assessment process continues with detailed analysis 58, and reporting and assessment 60. In the exemplary embodiment the detailed analysis 58 includes a domain-based learner analysis for curriculum 58a, a curriculum progression pathway analysis 58b, a learner retention analysis 58c, and a domain-based learner analysis for activities 58d. The reports may include all of the reports listed in Table 1, and are described further below along with these various analyses in conjunction with FIGS. 5-8.

Figure 4:
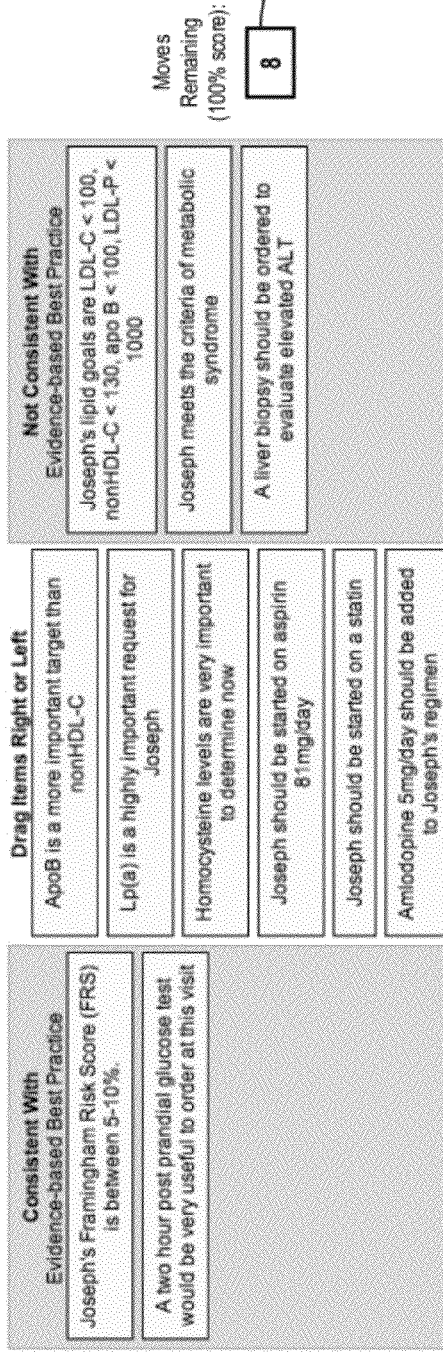
FIG. 4 is a screenshot from a display device of the computer system of FIG. 1 depicting a graphical user interface for a vignette-based question as part of a continuing medical education program in accordance with one embodiment of the present invention.

The curriculum includes a performance index question which is administered at baseline (pre-assessment prior to any activities), after every activity, and again in the PCA, as illustrated by the hashed boxes in FIG. 3. The performance index question is multidimensional and interactive, and is designed to assess level of performance in real-life situations. The performance index question includes a vignette describing various circumstances of a sample situation, and a set of statements that must be assigned to one of two categories. Those categories can generically be considered true/false, but may have alternative classifications, and there could be more than two categories in other implementations. For a CME implementation, the categories may be "Consistent with Evidence-based Best Practice" or "Not Consistent with Evidence-based Best Practice". FIG. 4 illustrates a screenshot 68 of an exemplary performance index question for the CME implementation. The vignette is a clinical description for a patient, and in this particular graphical user interface the statements are presented in a central column with the left column designated "Consistent with Evidence-based Best Practice" and the right column designated "Not Consistent with Evidence-based Best Practice". Learners click and drag statements from the central column into only one of the left and right columns; learners may be forced to move all of the statements or alternatively be allowed to keep those statements they are unsure about in the central column (they may or may not be told that they have this option). Learners are presented with the performance index at the end of each subsequent activity in the curriculum and in the PCA, and are asked to adjust their selections. The performance index question thus allows educators and administrators to evaluate learners from baseline through each activity. The performance index question is also useful in assessing learner retention in all domains.

The performance index question may optionally utilize a "countdown" feature regarding the number of moves that a learner can make in placing the statements in the columns. This feature is a motivational tool and is similar to a gaming tactic wherein the learner must make each move carefully as there is only has a certain limited number of moves allotted to get a perfect score (100%). Every click-and-drag operation (category assignment) counts as a move, so moving a statement from the left column to the right column and then back to the left column results in two moves even though the end result is the same as at start. The number of moves remaining 70 can be displayed with the vignette. The total number of moves allowed can be devised in various ways, such as the actual number of moves necessary to achieve a 100% score plus some value to tolerate a small number of mistakes (e.g., plus 4).

Figure 5:
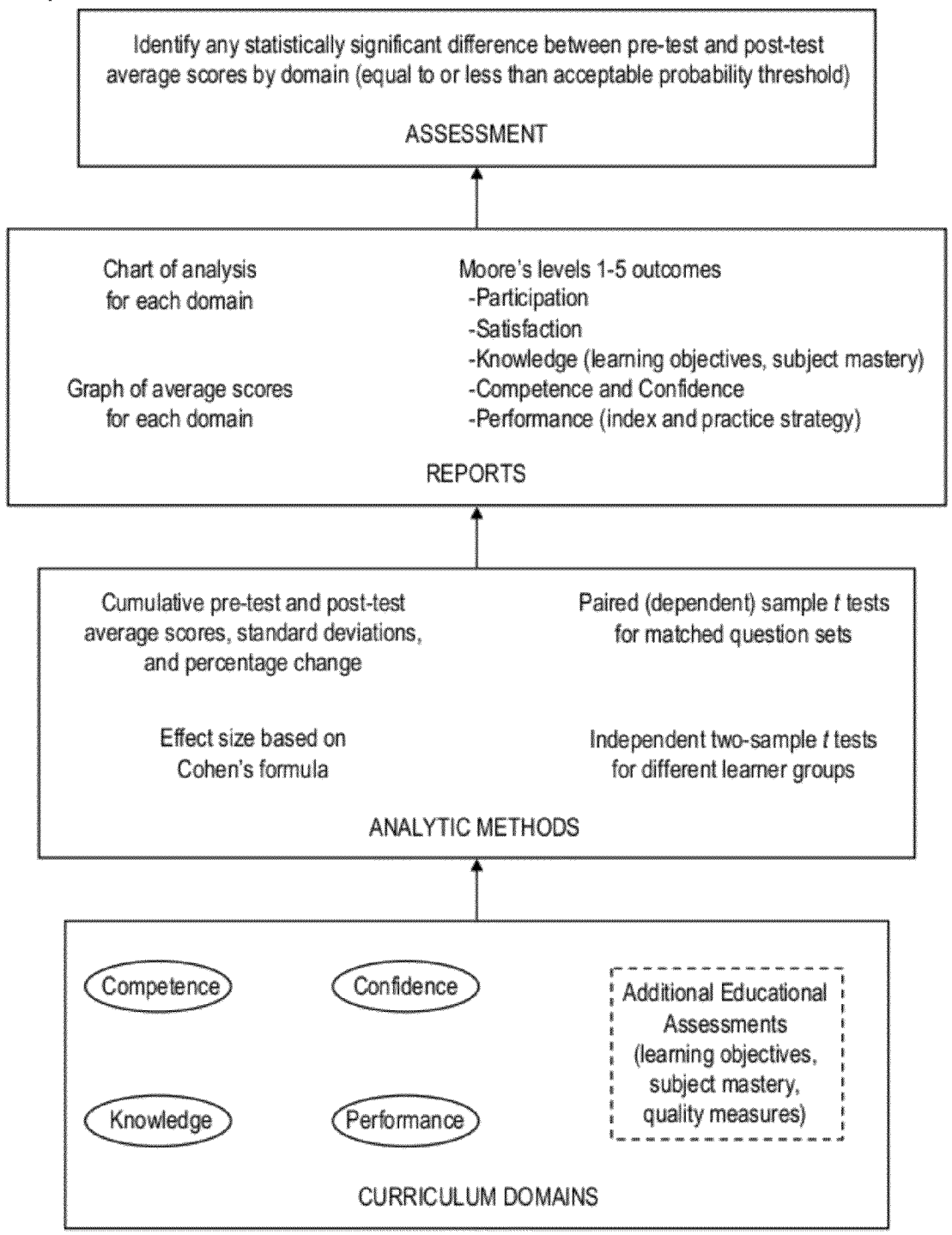
FIG. 5 is a chart illustrating a domain-based learner analysis for curriculum according to one implementation of the present invention.

With reference now to FIGS. 5-8, the reports and analyses are described in further detail. As used herein the term "average score" refers to an average of scores from multiple learners, e.g., a pre-test average score is the average of all learners' scores from that pre-test. FIG. 5 illustrates an exemplary domain-based learner analysis for curriculum. For the CME implementation the domains can be selected based on Moore's outcomes framework and include knowledge (cumulative pre-test to post-test change), competence (cumulative pre-test to post-test change), confidence (cumulative pre-test to post-test change), and performance (cumulative baseline to final intervention performance index change, and practice evaluations cumulative pre-test to post-test change), and each question in the pre-tests and post-tests can be assigned to one of these domains. Additional educational assessments may be made including learning objectives (measuring the success of the curriculum in achieving learning goals as defined by the developer of the curriculum), subject mastery (measuring the success of the curriculum in achieving participant proficiency in particular topics discussed in the activities), and quality measures (measuring the success of the curriculum in addressing adherence to standard best practices).

Four analytic methods are employed for this implementation of the domain-based learner analysis for curriculum. Cumulative pre-test and post-test average scores for each domain are calculated and reported as well as standard deviations and percentage change as a ratio of the pre-test/post-test average score difference to that pre-test average score.

The same calculations are performed between the baseline average score from the performance index question and the final intervention average score, that is, the performance index question given at the end of the last activity (not the PCA). Paired (dependent) sample t tests are conducted to assess the differences between mean evidence-based responses in matched question sets, at pre-test and post-test, i.e., a given question in a given pre-test is matched with the same question in that activity's post test. A paired sample t test can also be conducted on the performance index question stepwise at baseline and final intervention. Paired sample t testing generally is a known statistical method for assessing probabilities or confidence levels, particularly for normal distributions. The paired sample t testing for the domain-based learner analysis for curriculum results in a plurality of t values—for each domain there will be one t value per activity, and an additional t value for the complete curriculum. These t values can be translated to probability (P) values using standard lookup tables based on the appropriate degree of freedom (which in the illustrative embodiment is n−1 where n is the sample size). For example, at value of −2.171 for eleven degrees of freedom corresponds to a P value of 0.053. The lookup tables can be stored with the program instructions on the hard disk drive of computer system 10. Independent, two-sample t tests can further be conducted to assess the differences between mean evidence-based responses in matched question sets of two different learner groups, e.g., learner specialty or profession, at pre-test (baseline) and post-test (final intervention). This independent t testing uses Welch's t-test for samples of unequal sample size and unequal variance for comparative analysis. This test is used to compare performance differences between learner groups (e.g., specialty, demographics, profession). Effect size can also be calculated and reported for the performance index using Cohen's d formula. In this embodiment effect size is expressed as a non-overlap percentage, or the percentage of difference achieved by participants by the final intervention that was not present at baseline.

The results of the domain-based learner analysis for curriculum may be presented in the form of charts representing the analysis for each domain, across the curriculum, and in graphs representing the average scores for each domain across the curriculum. Specific outcomes reports can be organized according to Moore's outcomes framework for levels 1-5: Curriculum Report, Level 1—Participation (tracks overall learner engagement in the curriculum); Curriculum Report, Level 2—Satisfaction (provides a sample of the learner's recorded comments regarding the curriculum); Curriculum Report, Level 3A—Change in Knowledge (measures the change between the average score on pre-test knowledge questions and the average score on post-test knowledge questions across all activities in the curriculum); Curriculum Report, Level 3B—Learning Objective (measures the success of the curriculum in achieving each of the learning objectives of the curriculum as the change between the average score on all the pre-test and post-test questions that address a learning objective across all activities); Curriculum Report, Level 3C—Subject Mastery (measures the success of the curriculum in improving participant proficiency in a specific topic or subject area discussed in the activities as the change between the average score on all pre-test and post-test questions that address a subject area); Curriculum Report, Level 4A—Change in Competence (measures the change between the average score on pre-test Competence questions and the average score on post-test Competence questions across all activities in the curriculum); Curriculum Report, Level 4B—Change in Confidence (measures the change between the average score on the pre-test Confidence questions and the average score on the post-test Confidence questions across all activities in the curriculum); Curriculum Report, Level 5A—Performance Index (the performance index question as presented to learners in each activity); Curriculum Report, Level 5B—Performance Change (measures the change and difference (effect size) between the average performance index score of curriculum participants at baseline and the average performance index score of participants after their last activity); Curriculum Report, Level 5C—Performance Index Population (measures the performance index score of the entire population of learners as they progress through multiple activities within a curriculum); Curriculum Report, Level 5D—Performance Index Progression (measures the change in the performance index score based on the number of activities each group completes), Curriculum Report Level 5E—Performance Index Engagement (measures the change between the average performance index score of learners at baseline and after the final activity, as a function of the number of activities participated in), and Curriculum Report, Level 5F—Change in Practice (measures the change between the average score on the pre-test practice questions and the average score on post-test practice questions across all activities in the curriculum). The final assessment for this implementation of the domain-based learner analysis for curriculum identifies any statistically significant differences between pre-test (baseline) and post-test (final intervention) average scores, by domain. Significance may be determined by comparison to a predetermined acceptable probability threshold, such as a P value equal to or less than 0.05. Content associated with the question set or activity which resulted in a significant difference and is relevant to the learner's patient population demonstrates an important potential educational impact and is reported.

Figure 6:
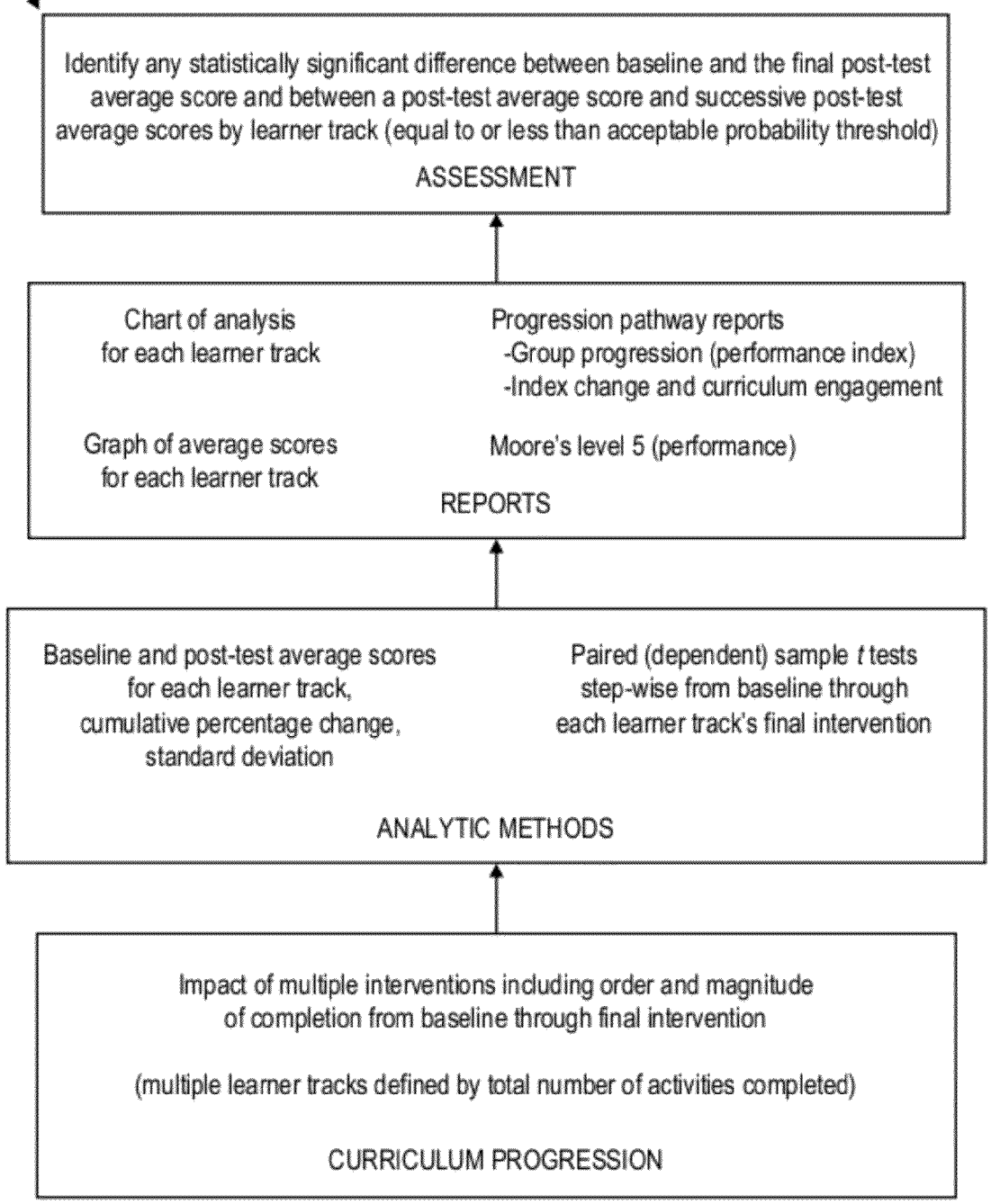
FIG. 6 is a chart illustrating a curriculum progression pathway analysis according to one implementation of the present invention.

FIG. 6 illustrates an exemplary curriculum progression pathway analysis which includes assessment of the impact of multiple interventions including order and magnitude of curriculum completion from baseline through final intervention. In a curriculum such as that illustrated in FIG. 3 there are multiple stages or learner tracks defined by the activities, and different learner groups may progress through these stages at different times. In the example of FIG. 3 there are four learner tracks, i.e., a first group of learners may have completed only the first activity, a second group of learners may have completed only the first two activities, a third group of learners may have completed all but the last activity, and a fourth group of learners may have completed all activities. For this implementation the curriculum progression pathway analysis includes calculation and reporting of performance index baseline average scores and post-activity average scores for each learner track, as well as cumulative percent change and standard deviation. Continuing with the example of FIG. 3, the first group of learners would have a baseline average score and a final intervention score based on the performance index question administered after the first activity, the second group of learners would have another baseline average score and a final intervention score based on the performance index question administered after the second activity, the third group of learners would have another baseline average score and a final intervention score based on the performance index question administered after the third activity, and the fourth group of learners would have another baseline average score and a final intervention score based on the performance index question administered after the fourth activity. Paired sample t tests are conducted to assess the differences between mean evidence-based responses, from the baseline performance index to each learner track's final intervention index and at the conclusion of each subsequent activity completed.

The results of the curriculum progression pathway analysis may be presented in the form of charts representing the analysis for each learner track across the curriculum and for each activity, and in graphs representing the average scores for each learner track across the curriculum and for each activity. Specific reports may include a Performance Index Progression Report, which organizes participants into groups based on the number of activities completed. The performance index scores for each group are then measured as participants progress through activities in the curriculum. A Performance Index Change and Curriculum Engagement Report may also be included which measures the change between the average performance index score of curriculum participants at baseline and the average performance index score of participants after their last activity as a function of the number of activities that learners participated in. The final assessment for this analysis identifies any statistically significant differences between average performance index scores for each learner track, i.e., between the baseline average score and a final post-activity average score for the final activity of that learner group and between each post-activity average score and any successive post-activity average scores (from later activities) for each learner group. Significance may again be determined by comparison to an acceptable probability threshold, such as a P value equal to or less than 0.05.

Figure 7:
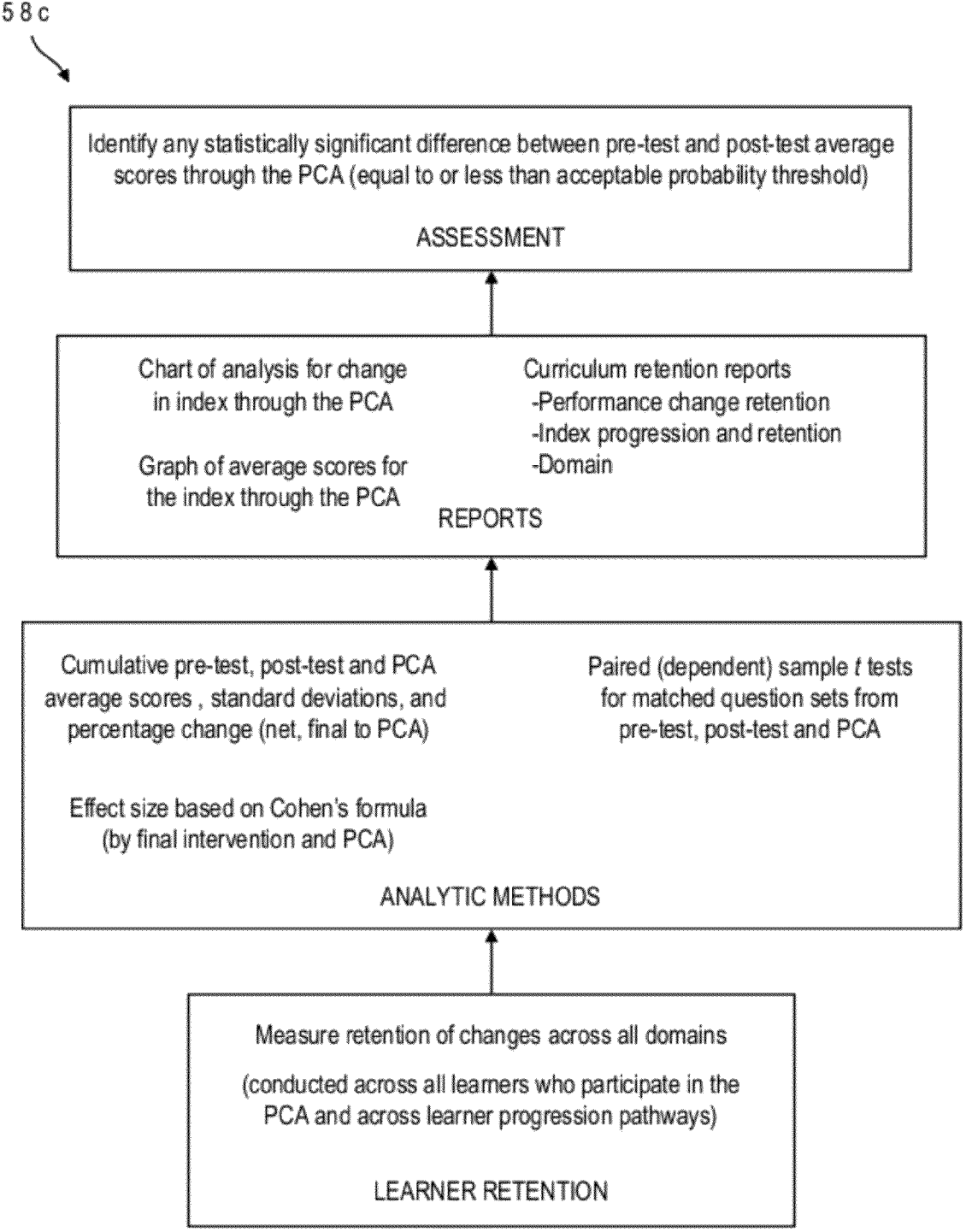
FIG. 7 is a chart illustrating a learner retention analysis according to one implementation of the present invention.

FIG. 7 illustrates an exemplary learner retention analysis in which post-curriculum assessment data is analyzed to measure retention of changes across all domains (Knowledge, Confidence, Competence, Performance). The learner retention analysis can be conducted across all learners who participate in the PCA and across all learner progression pathways. For this implementation the learner retention analysis includes calculation of cumulative pre-test (baseline), post-test (final intervention), and the PCA average scores are calculated and reported as well as percent change (net, and final to PCA). Paired sample t tests are conducted to assess the differences between mean evidence-based responses in matched question sets from pre-test (baseline), post-test (final intervention), and PCA. Effect size for the performance index is calculated using Cohen's d formula, and is expressed as a non-overlap percentage or the percentage of difference achieved by participants, by the final intervention and PCA, that was not present at baseline.

The results of the learner retention analysis may be presented in the form of charts representing the change in the performance index, from baseline across the curriculum to the PCA, and in graphs representing the average scores for the performance index, from baseline across the curriculum to the PCA. Specific reports can include a Performance Change Retention Report which measures the change between the average performance index score of curriculum participants at baseline and the average performance index score of participants engaging in the PCA. That report can measure the average performance index score change from baseline to the final activity, and the change from the final average performance index score in the curriculum to the average performance index score in the PCA. A Performance Index Progression and Retention Report may also be included which measures the average performance index score of participants as they progress through the curriculum and the PCA. A Domain Curriculum Retention Report may further be included which measures the change and difference in average knowledge, competence, confidence, and practice post-test scores to average PCA scores. The average pre-test scores are then compared to the average PCA scores to calculate the net percent change. The final assessment for this analysis identifies any statistically significant differences between average scores from pre-test (baseline), to the post-test (final intervention), to the PCA. Significance may again be determined by comparison to an acceptable probability threshold, such as a P value equal to or less than 0.05.

Figure 8:
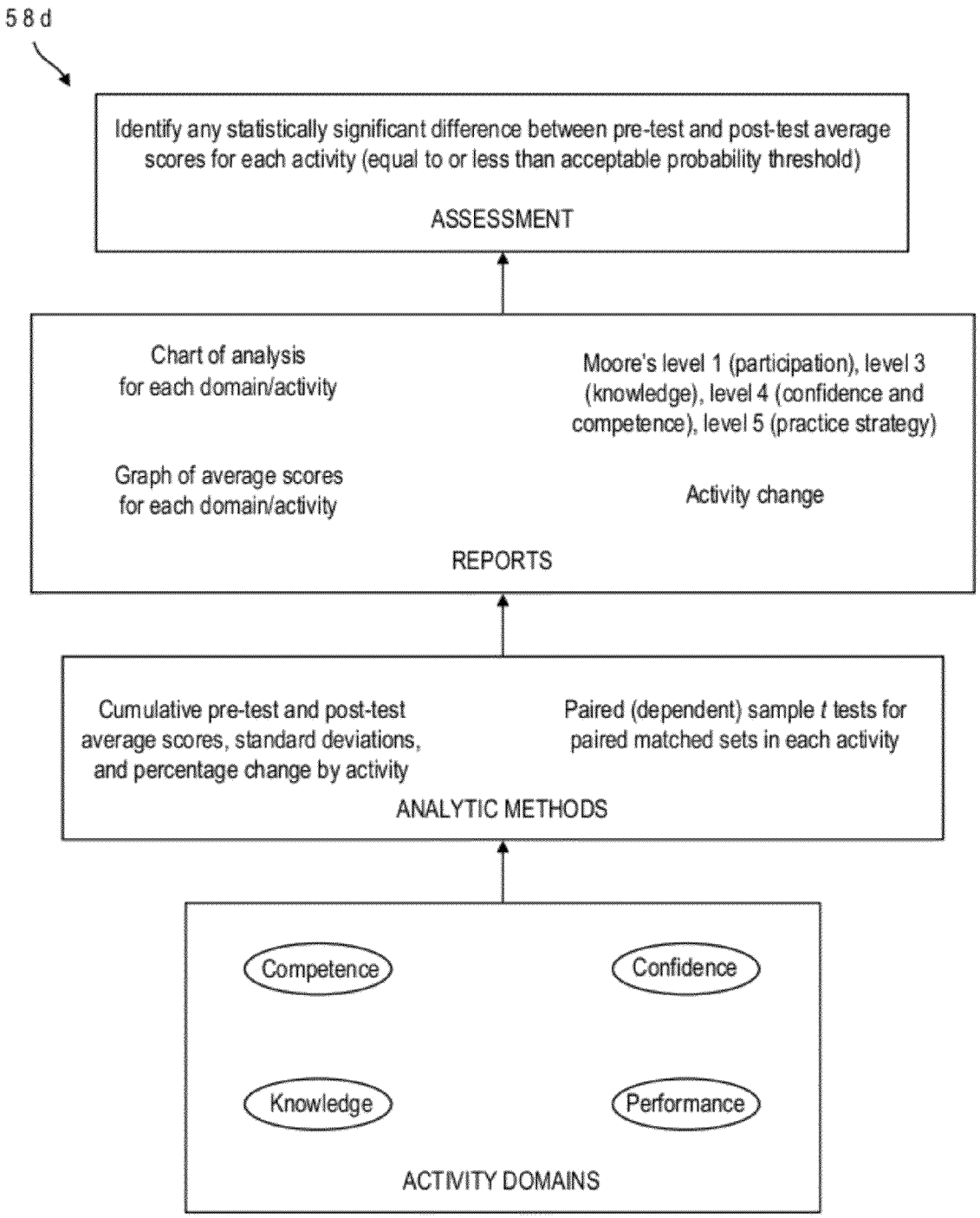
FIG. 8 is a chart illustrating a domain-based learner analysis for activities according to one implementation of the present invention.

FIG. 8 illustrates an exemplary domain-based learner analysis for activities. The domains again include knowledge (pre-test to post-test change), competence (pre-test to post-test change), confidence (pre-test to post-test change), and performance (pre-test to post-test self-reported practice changes). Every activity in the curriculum is analyzed individually. For this implementation the domain-based learner analysis for activities includes calculation and reporting of cumulative pre-test and post-test average scores by activity. Paired sample t tests are conducted to assess the differences between mean evidence-based responses in matched question sets, at pre-test and post-test in each activity.

The results of the domain-based learner analysis for activities may be presented in the form of charts representing the analysis for each domain and each activity, and in graphs representing the average scores for each domain and each activity. Specific reports can include a Curriculum Report, Level 1—Participation which tracks overall learner engagement in curriculum by activity, and Activity Reports which measure the change between the average score on pre-test knowledge, competence, confidence and practice questions and the average score on the post-test questions for each activity in the curriculum. The final assessment for this analysis identifies any statistically significant differences between average scores within each activity. Significance may again be determined by comparison to an acceptable probability threshold, such as a P value equal to or less than 0.05.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the illustrative implementation assigns a statistical significance to P values less than about 0.05, but larger or smaller P values may be selected as a threshold value according to the confidence level desired by the user of the assessment program. The statistical differences may be positive or negative. Other measures of statistical significance may be used, and other formulations besides paired t testing. Also, the performance index question is presented in a specific format and graphical user interface but the index question could be presented in other forms. It is therefore contemplated that such modifications can be made without departing from the spirit or scope of the present invention as defined in the appended claims.

What is claimed is:

1. A computer-implemented method of assessing an educational program having multiple ordered activities defining multiple learner tracks, the method comprising:

receiving baseline performance index scores and post-activity performance index scores for a plurality of learners engaging in the educational program by executing first instructions in a computer system, wherein the baseline performance index scores are derived from a performance index test administered to the learners prior to any of the activities, and the post-activity performance index scores are derived from the performance index test administered to the learners after each of the activities;

organizing the learners into learner groups based on how many of the activities a learner has completed by executing second instructions in the computer system;

for each given learner group,
calculating a baseline average score using the baseline performance index scores of learners in the given learner group,
calculating a post-activity average score for each of the activities which have been completed by learners in the given learner group, and
calculating first statistical differences between the baseline average score and a final one of the post-activity average scores for the given learner group, and between each post-activity average score and any successive post-activity average scores for the given learner group by executing third instructions in the computer system;

receiving pre-test scores and corresponding post-test scores for learners who have completed at least one of the activities, wherein the pre-test scores and post-test scores are derived from separate activity tests administered prior to and after each activity, and the separate activity tests include questions in each of a plurality of domains including at least knowledge, competence, confidence and performance by executing fourth instructions in the computer system;

receiving post-curriculum assessment scores for learners who have completed a selection of the activities, wherein the post-curriculum assessment scores are derived from the performance index test and the separate activity tests administered to the learners no earlier than a designated period of time after completion of the selection of the activities by executing fifth instructions in the computer system;

for each given domain,
calculating pre-test domain average scores using the pre-test scores for questions in the given domain,
calculating post-test domain average scores using the post-test scores for questions in the given domain, and
calculating second statistical differences between the pre-test domain average scores and corresponding post-test domain average scores by executing sixth instructions in the computer system;

for each given activity,
calculating a pre-test activity average score using the pre-test scores for the given activity,
calculating a post-test activity average score using the post-test scores for the given activity, and
calculating third statistical differences between the pre-test activity average scores and corresponding post-test activity average scores by executing seventh instructions in the computer system;

calculating a post-curriculum assessment average score using the post-curriculum assessment scores by executing eighth instructions in the computer system;

calculating fourth statistical differences between the baseline average score and the post-curriculum assessment average score and between the post-activity average scores and the post-curriculum assessment average score by executing ninth instructions in the computer system; and identifying any of the first, second, third or fourth statistical differences which are equal to or less than a predetermined probability threshold by executing tenth instructions in the computer system.

2. The method of claim 1 wherein:
the statistical differences are calculated using paired sample t testing for the performance index test; and
the predetermined probability threshold is a P value of 0.05.

3. The method of claim 1, further comprising generating a report describing statistical conclusions and inferences associated with any identified differences.

4. The method of claim 1 wherein the performance index test includes a description of circumstances for a sample situation, a set of questions in the form of statements which are to be assigned to only one of at least two statement categories, and an indicator for an allowable number of assignments and re-assignments of the statements to particular categories in order to achieve a perfect score.

5. The method of claim 4 wherein the educational program is a continuing medical education program and the description is a clinical vignette.

6. A computer system comprising:
one or more processors which process program instructions;
a memory device connected to said one or more processors; and
program instructions residing in said memory device for assessing an educational program having multiple ordered activities defining multiple learner tracks by receiving baseline performance index scores and post-activity performance index scores for a plurality of learners engaging in the educational program wherein the baseline performance index scores are derived from a performance index test administered to the learners prior to any of the activities and the post-activity performance index scores are derived from the performance index test administered to the learners after each of the activities, organizing the learners into learner groups based on how many of the activities a learner has completed, for each given learner group calculating a baseline average score using the baseline performance index scores of learners in the given learner group, a post-activity average score for each of the activities which have been completed by learners in the given learner group, and first statistical differences between the baseline average score and a final one of the post-activity average scores for the given learner group and between each post-activity average score and any successive post-activity average scores for the given learner group, assessing the educational program by receiving pre-test scores and corresponding post-test scores for learners who have completed at least one of the activities wherein the pre-test scores and post-test scores are derived from separate activity tests administered prior to and after each activity and the separate activity tests include questions in each of a plurality of domains including at least knowledge, competence, confidence and performance, receiving post-curriculum assessment scores for learners who have completed a selection of the activities, wherein the post-curriculum assessment scores are derived from the performance index test and the separate activity tests administered to the learners no earlier than a designated period of time after completion of a selection of the activities, for each given domain calculating pre-test domain average scores using the pre-test scores for questions in the given domain, post-test domain average scores using the post-test scores for questions in the given domain, and second statistical differences between the pre-test domain average scores and corresponding post-test domain average scores, for each given activity calculating a pre-test activity average score using the pre-test scores for the given activity, a post-test activity average score using the post-test scores for the given activity, and third statistical differences between the pre-test activity average scores and corresponding post-test activity average scores, calculating a post-curriculum assessment average score using the post-curriculum assessment scores, calculating fourth statistical differences between the baseline average score and the post-curriculum assessment average score and between the post-activity average scores and the post-curriculum assessment average score, and identifying any of the first, second, third or fourth statistical differences which are equal to or less than a predetermined probability threshold.

7. The computer system of claim 6 wherein:
the statistical differences are calculated using paired sample t testing for the performance index test; and
the predetermined probability threshold is a P value of 0.05.

8. The computer system of claim 6 wherein said program instructions further generate a report describing statistical conclusions and inferences associated with any identified differences.

9. The computer system of claim 6 wherein the performance index test includes a description of circumstances for a sample situation, a set of questions in the form of statements which are to be assigned to only one of at least two statement categories, and an indicator for an allowable number of assignments and re-assignments of the statements to particular categories in order to achieve a perfect score.

10. The computer system of claim 9 wherein the educational program is a continuing medical education program and the description is a clinical vignette.

11. A computer program product comprising:
a computer-readable storage medium; and
program instructions residing in said storage medium for assessing an educational program having multiple ordered activities defining multiple learner tracks by receiving baseline performance index scores and post-activity performance index scores for a plurality of learners engaging in the educational program wherein the baseline performance index scores are derived from a performance index test administered to the learners prior to any of the activities and the post-activity performance index scores are derived from the performance index test administered to the learners after each of the activities, organizing the learners into learner groups based on how many of the activities a learner has completed, for each given learner group calculating a baseline average score using the baseline performance index scores of learners in the given learner group, a post-activity average score for each of the activities which have been completed by learners in the given learner group, and first statistical differences between the baseline average score and a final one of the post-activity average scores for the given learner group and between each post-activity average score and any successive post-activity average scores for the given learner group, assessing the educational program by receiving pre-test scores and corresponding post-test scores for learners who have completed at least one of the activities wherein the pre-test scores and post-test scores are derived from separate activity tests administered prior to and after each activity and the separate activity tests include questions in each of a plurality of domains including at least knowledge, competence, confidence and performance, receiving post-curriculum assessment scores for learners who have completed a selection of the activities, wherein the post-curriculum assessment scores are derived from the performance index test and the separate activity tests administered to the learners no earlier than a designated period of time after completion of the selection of the activities, for each given domain calculating pre-test domain average scores using the pre-test scores for questions in the given domain, post-test domain average scores using the post-test scores for questions in the given domain, and second statistical differences between the pre-test domain average scores and corresponding post-test domain average scores, for each given activity calculating a pre-test activity average score using the pre-test scores for the given activity, a post-test activity average score using the post-test scores for the given activity, and third statistical differences between the pre-test activity average scores and corresponding post-test activity average scores, calculating a post-curriculum assessment average score using the post-curriculum assessment scores, calculating fourth statistical differences between the baseline average score and the post-curriculum assessment average score and between the post-activity average scores and the post-curriculum assessment average score, and identifying any of the first, second, third or fourth statistical differences which are equal to or less than a predetermined probability threshold.

12. The computer program product of claim 11 wherein:
the statistical differences are calculated using paired sample t testing for the performance index test; and the predetermined probability threshold is a P value of 0.05.

13. The computer program product of claim 11 wherein said program instructions further generate a report describing statistical conclusions and inferences of activities associated with any identified differences.

14. The computer program product of claim 11 wherein the performance index test includes a description of circumstances for a sample situation, a set of questions in the form of statements which are to be assigned to only one of at least two statement categories, and an indicator for an allowable number of assignments and re-assignments of the statements to particular categories in order to achieve a perfect score.

15. The computer program product of claim 14 wherein the educational program is a continuing medical education program and the description is a clinical vignette.

* * * * *